United States Patent

[11] 3,609,026

| [72] | Inventor | Max Verebay<br>Jamaica, N.Y. |
|---|---|---|
| [21] | Appl. No. | 825,685 |
| [22] | Filed | May 19, 1969 |
| [45] | Patented | Sept. 28, 1971 |
| [73] | Assignee | Visionetics, Inc.<br>Long Island, N.Y. |

[54] STAGE FOR TRANSPARENCY PROJECTION
10 Claims, 8 Drawing Figs.

[52] U.S. Cl............................................. 353/120,
40/106.1, 353/103
[51] Int. Cl............................................. G03b 27/00
[50] Field of Search......................................... 353/103,
114, 120, 23, 35, 30; 40/106.1; 355/75

[56] References Cited
UNITED STATES PATENTS
| 2,210,333 | 8/1940 | Kroner......................... | 353/35 |
| 3,036,496 | 5/1962 | Frederick et al............... | 353/30 |
| 3,253,358 | 5/1966 | Wright.......................... | 40/106.1 |

FOREIGN PATENTS
| 1,161,130 | 8/1969 | Great Britain................ | 353/120 |

OTHER REFERENCES
IBM Technical Disclosure Bulletin, Vol. 9, No. 12, May 1967, p. 1778 353/120

*Primary Examiner*—William D. Martin, Jr.
*Attorney*—Friedman & Goodman

ABSTRACT: A stage assembly for the projection of transparencies comprising a main frame adapted to slidingly and opposingly house a viewing member and a supporting member so that the viewing and supporting members may be horizontally extended for use or horizontally retracted when not in use.

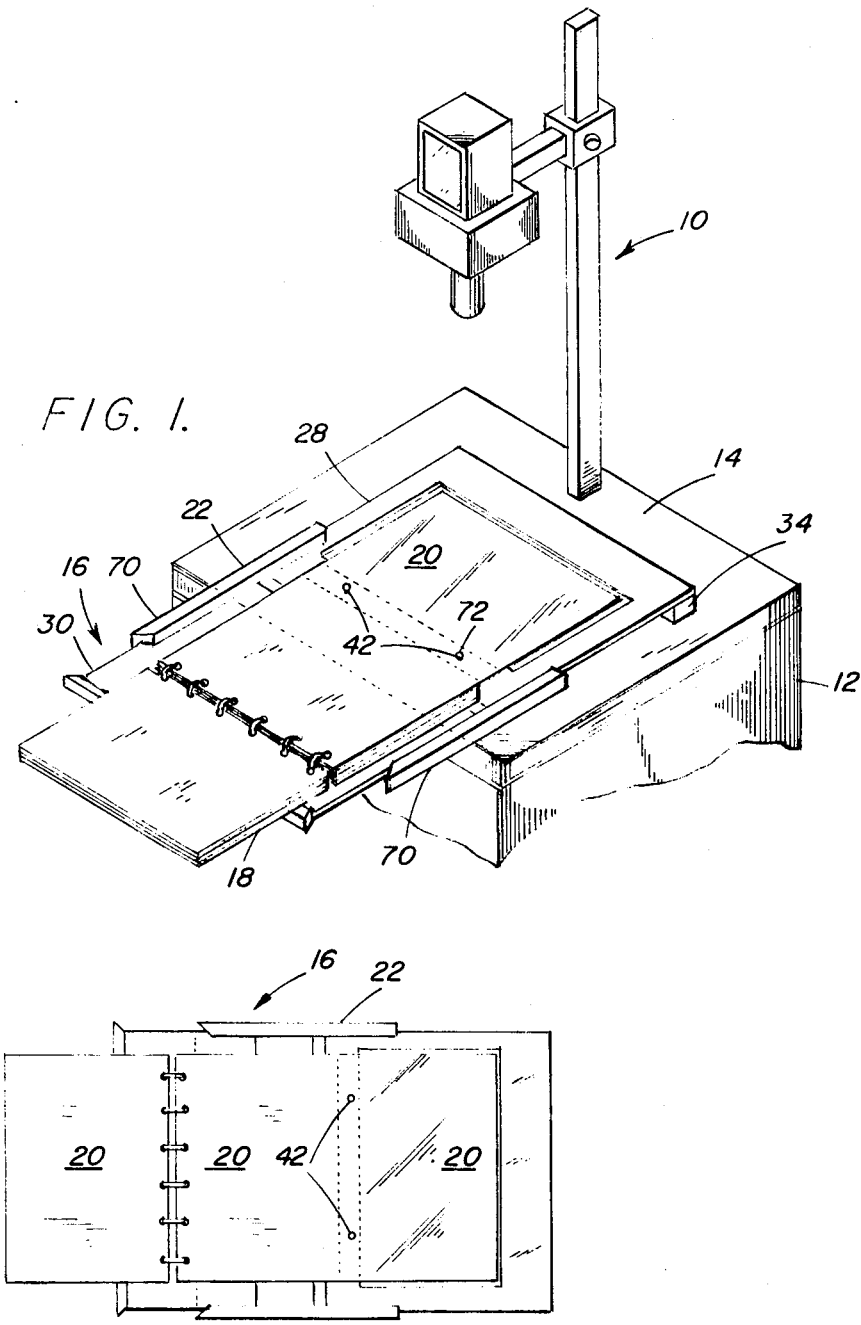

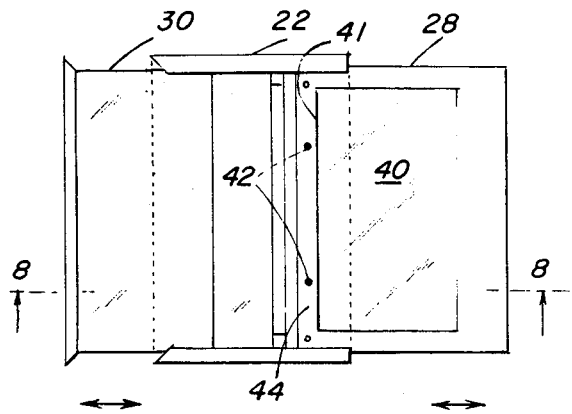
FIG. 3.
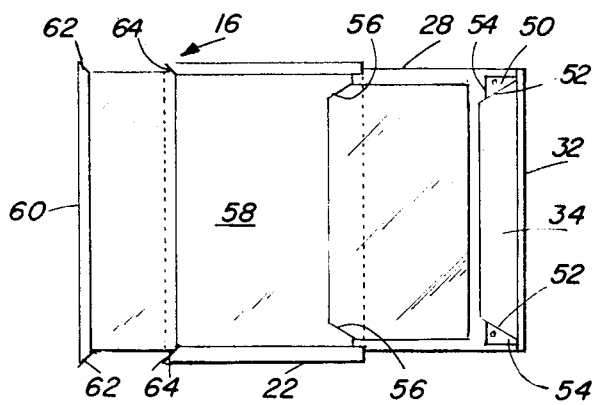
FIG. 4.
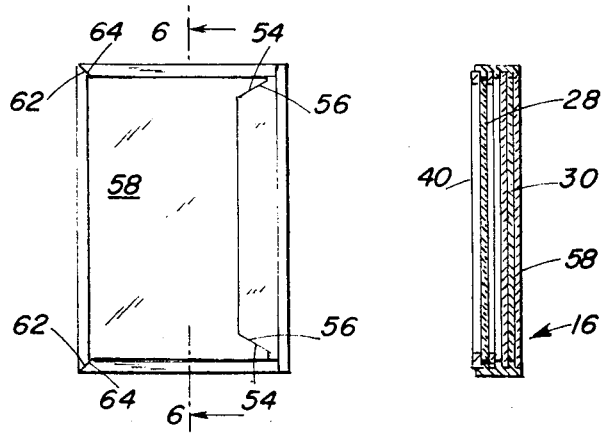
FIG. 5.
FIG. 6.
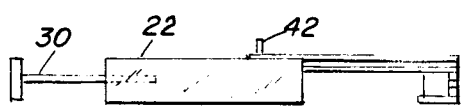
FIG. 7.
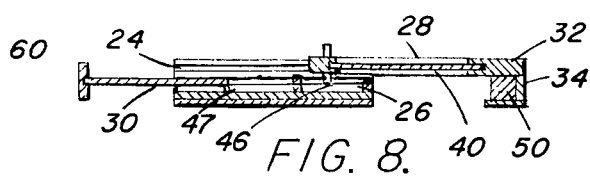
FIG. 8.
INVENTOR.
MAX VEREBAY 3,609,026

STAGE FOR TRANSPARENCY PROJECTION

BACKGROUND OF THE INVENTION

1. Field of the Invention

This invention relates generally to means for projecting transparencies, and more particularly, to a stage assembly for the projection of such transparencies.

2. Description of the Prior Art

Transparencies are commonly projected by an overhead projector consisting of a light source in a lightproof box, a lens combination, mirror and a transparent stage or table forming a part of the top of the box. Light then projected through the transparent portion of the table is passed through single or multiple pages of transparencies to be then directed into a suitable housing in such position that an angularly disposed mirror will project the light and image through a suitable lens assembly for exhibition of the selected views upon a viewing screen therefor.

An additional framing device may be provided, for use with the overhead projector, in which device the transparency is placed for positioning over the transparent portion of the tabletop.

SUMMARY OF THE INVENTION

It is therefore among one of the principal objectives of this invention to provide a novel stage assembly or framing device for an overhead-type projector.

In accordance with the present invention, then there is now provided a stage assembly for the projection of transparencies comprising a main frame adapted to slidingly and opposingly house a viewing member and a supporting member in superposable relation so that the viewing and supporting members may be horizontally extended for use or alternatively horizontally retracted for nonuse.

BRIEF DESCRIPTION OF THE DRAWING

The invention will be hereinafter more fully described with reference to the accompanying drawing in which:

FIG. 1 is a view in perspective, partially fragmented, showing the invention stage assembly in its operative relationship with an overhead projector.

FIG. 2 is a top plan view showing the stage assembly in the fully extended condition with a book of transparencies resting thereon.

FIG. 3 is a view similar to FIG. 2 except that the book has been removed.

FIG. 4 is a bottom plan view of the device shown in FIG. 3.

FIG. 5 is a bottom plan view of the stage assembly in the fully retracted condition.

FIG. 6 is a view taken along line 6–6 of FIG. 5.

FIG. 7 is an end view of the device as shown in FIG. 3.

FIG. 8 is a sectional view taken along line 8–8 of FIG. 3.

DESCRIPTION OF THE PREFERRED EMBODIMENTS

Referring now to the FIGS. in detail, there is shown in FIG. 1 an overhead projector 10 of conventional construction mounted on a lightproof box 12 which includes a transparent table portion 14. The invention stage assembly 16, hereinafter referred to as "stage," is shown resting on the transparent table 14. In viewing conjunction with the stage 16, for illustration, there is shown placed thereon a specially adapted book of transparencies 18; however, any suitable book of transparencies or individual transparency may be employed. The book 18 is more fully described in copending application Ser. No. 825,831, filed May 19,1969, for "BOOK FOR HOLDING TRANSPARENCIES FOR VIEWING AND STORAGE", assigned to this common assignee and filed on the same date as the instant application. For present purposes suffice it to say that the book holds a plurality of pages 20 of transparencies suitable for viewing by the overhead projector.

The stage 16 (FIGS. 2–7) comprises a generally rectangular shaped main frame 22 provided with a pair of transversely oriented superposed opposing rectangular shaped channels 24, 26 suitable for slidingly receiving in opposition, a viewing member 28 and a supporting member 30, e.g., for supporting a book or the like, respectively. Accordingly, members 28 and 30 are of a rectangular shape which will slidingly fit inside the channels 24 and 26, one over the other, respectively.

At the external longitudinal edge 32 of the viewing member, there is provided a longitudinally oriented foot 34 which renders the viewing member 28 level with the main frame 22, in either the extended or retracted condition, as will be more fully understood hereinbelow. A rectangular sheet of transparent glass 40 is mounted in a generally central location in the viewing member 28. A pair of vertically aligned bosses 42, whose function will be subsequently described, are provided on the inner longitudinal end 44 of member 28 immediately adjacent to the longitudinal edge 41 of the glass 40. A stop 46, provided on the underside of viewing member 28, prevents it from falling out of its channel 24, when the member 28 is in the extended condition. A suitable weight 50, e.g., lead, provided inside the foot 34 adds stability to the viewing member in the extended condition. The opposing ends 52 of the foot 34 are inwardly tapered as at 54, so that when viewing member 28 is in the fully retracted condition, i.e., inside channel 24, the tapered portions 54 will smoothly abut against associatingly tapered portions 56 of the underside 58 of the main frame 22 so that the essentially rectangular conformation of the main frame 22 will remain.

The supporting member 30 slides inside channel 26 under channel 24 and viewing member 28 is provided with an outer longitudinal strip 60 which is also tapered at its opposing longitudinal edges as at 62 so that it too will smoothly abut against associatingly tapered portions 64 of the main frame 22 when it is in the fully retracted condition. Thus, looking at FIG. 5, particularly, it can be seen that the essentially rectangular conformation of the main frame is maintained when both members 28 and 30 are held fully within, achieving a neat compact stage assembly, easily transportable and storeable. Further, it can be seen now how weighted foot 34 aids in maintaining the level condition of the main frame in the retracted condition of the viewing member 28. A stop 47, provided on the underside of supporting member 30, prevents it from falling out of its channel 26, when the member 30 is in the extended condition.

Stage 16 may be made of any suitable material sufficiently rigid, e.g., wood or metal, preferably wood, to rest in a steady position on table 14.

Describing now the operation of the invention stage in conjunction with the overhead projector 10, the stage 16 is placed on the transparent table 14 and the viewing member 28 is extended out of channel 24 so that the transparent glass 40 is fully exposed to the light coming out of the lightproof box 12. It is to be noted, especially by viewing FIG. 1, that by virtue of the foot 34 projecting downwardly even with the transverse sides 70 of the frame member 22, that the frame member 22 and the viewing member 28 are maintained in a steady and level position on the table 14. Weight 50 also aids in the maintenance of stability of the stage in the viewing position.

Next, a transparency contained on a page 20 of a source of such transparencies, e.g., specially adapted book 18, is placed over the glass 40 of the viewing member. The page 20 can be held firmly by utilizing the bosses 42 which are insertable into registered apertures 72 provided at the border of said page. The supporting member 30 may be extended in order to support the rest of the books. If such additional support is not required, then the member 30 may remain retracted. However, preferably when using a book of the aforementioned type, the supporting member 30 is extended.

I claim:

1. A stage assembly for the projection of transparencies comprising a main frame including two spaced-apart sidewalls and a bottom wall disposed between said sidewalls to hold said sidewalls in a vertical position, said sidewalls being provided with a pair of transversely oriented superposed opposing chan-